United States Patent [19]
Hur

[11] Patent Number: 5,410,146
[45] Date of Patent: Apr. 25, 1995

[54] CONTACT IMAGE SENSOR WITH MEANDERING DATA LINES CONNECTED TO OPPOSITE SWITCHING ELEMENTS IN ALTERNATING SENSOR BLOCKS

[75] Inventor: Chang W. Hur, Seoul, Rep. of Korea

[73] Assignee: Goldstar Co., Ltd., Seoul, Rep. of Korea

[21] Appl. No.: 173,496

[22] Filed: Dec. 23, 1993

[30] Foreign Application Priority Data

Dec. 26, 1992 [KR] Rep. of Korea ............. 25568

[51] Int. Cl.$^6$ ............................................. H01J 40/14
[52] U.S. Cl. ..................................... 250/208.1; 348/308
[58] Field of Search .................... 250/208.1; 348/308, 348/302, 294, 311, 275; 358/482, 483

[56] References Cited

U.S. PATENT DOCUMENTS

| | | | |
|---|---|---|---|
| 4,566,040 | 1/1986 | Ozawa et al. | 358/293 |
| 4,589,026 | 5/1986 | Ozawa et al. | 358/213 |
| 5,027,226 | 6/1991 | Nagata et al. | 358/482 |
| 5,142,137 | 8/1992 | Kushino et al. | 250/208.1 |
| 5,160,836 | 11/1992 | Miyake | 250/208.1 |
| 5,264,938 | 11/1993 | Nobue | 358/213.15 |
| 5,291,292 | 3/1994 | Hotta | 348/308 |

OTHER PUBLICATIONS

Miyake, H., et al., High–Performance a–Si:H Thin Film Transistor Driven Linear Image Sensor with New Multiplex Structure for G4 Facsimile, Japanese Journal of Applied Physics, vol. 29, No. 12, pp. L2373–L2376 (Dec. 1990).

Primary Examiner—David C. Nelms
Assistant Examiner—Steven L. Nichols
Attorney, Agent, or Firm—John P. White

[57] ABSTRACT

A contact image sensor having an arrangement capable of reducing the number of data lines passing adjacent photoelectric converters, thereby achieving a high resonance and an easy design. The contact image sensor includes a photoelectric conversion unit including m aligned blocks each having n aligned photoelectric converters, a switching unit including m aligned blocks each having n aligned thin film transistors classified into $n/2^k$ groups each having $2^k$ thin film transistors and connected to respective photoelectric converters of each corresponding block of photoelectric conversion unit, $2^k m$ gate lines classified into groups each having $2^k$ gate lines respectively connected in common to gate electrodes of the same numbered thin film transistors of the thin film transistor groups of each corresponding block of the switching unit, $n/2^k$ data lines respectively connected in common to drain electrodes of the thin film transistors of predetermined groups of the blocks of the switching unit to construct an alternative type arrangement, and a bias line connected in common to all photoelectric converters of the photoelectric conversion unit 1 and adapted to apply a bias signal for a photoelectric conversion to the photoelectric converters.

5 Claims, 7 Drawing Sheets

CONTACT IMAGE SENSOR WITH MEANDERING DATA LINES CONNECTED TO OPPOSITE SWITCHING ELEMENTS IN ALTERNATING SENSOR BLOCKS

BACKGROUND OF THE INVENTION

The present invention relates to a contact image sensor employed in facsimiles, scanners for personal computers and scanner for copy machines, and more particularly to a contact image sensor having a data line arrangement capable of inhibiting a crosstalk phenomenon between neighboring data lines for a transmission of charges generated from photoelectric converters.

Generally, contact image sensors are widely used as important elements for scanning graphics and characters in facsimiles, personal computers and electronic copy machines. Such contact image sensors should accurately transmit image information sensed to processing units without any distortion of the image information. However, since many data lines are formed in a given area in fabrication of a contact image sensor, a parasitic capacitance may be generated among the data lines. Such a parasitic capacitance generates a crosstalk phenomenon resulting in a time delay and a signal distortion. As a result, a deterioration in performance of the entire system may occur.

For solving such problems, various researches are actively in progress. Now, conventional contact image sensors proposed to solve the above-mentioned problems will be described, in conjunction with the annexed drawings.

Figure 1:
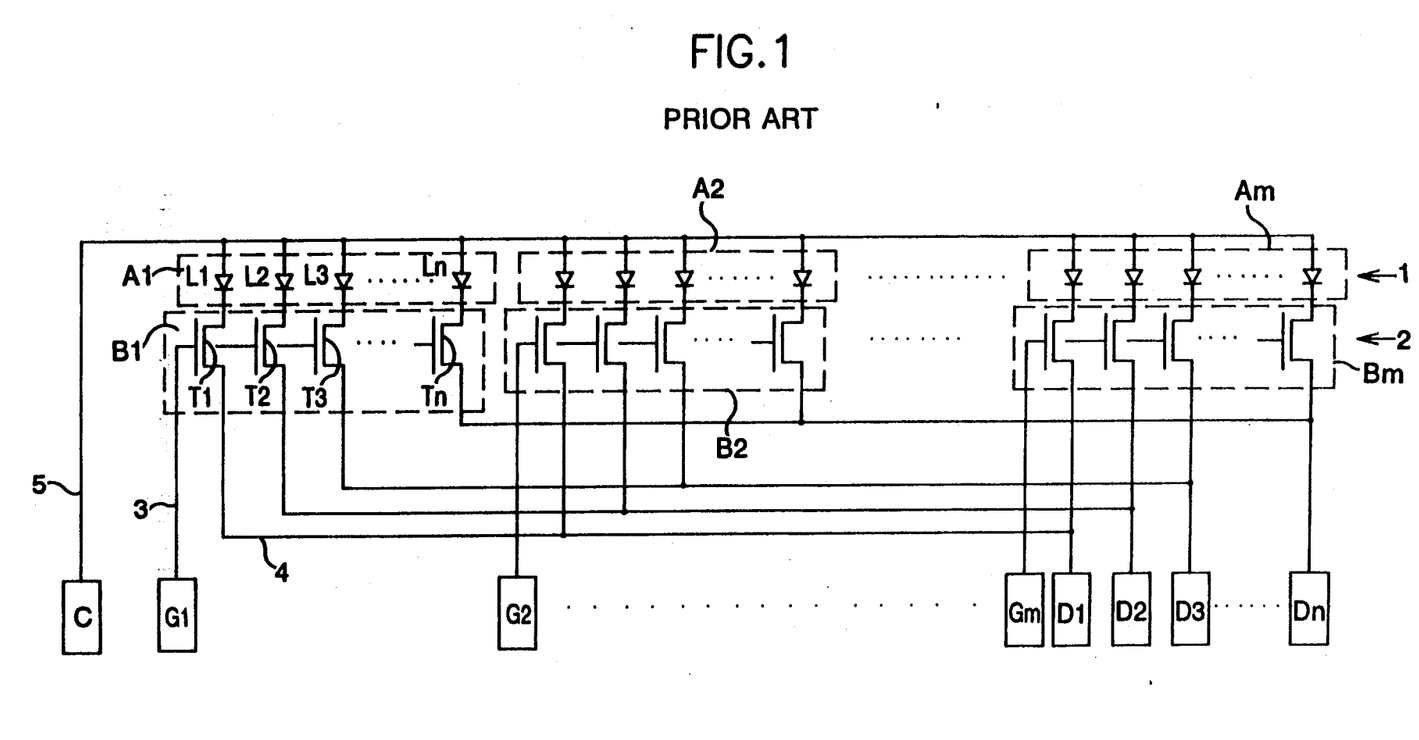
FIG. 1 is a circuit diagram of a conventional type contact image sensor in accordance with the prior art.

FIG. 1 is a circuit diagram of a conventional type contact image sensor. As shown in FIG. 1, the contact image sensor comprises a photoelectric conversion unit 1 including m aligned blocks each having n aligned photoelectric converters and serving to convert an optical signal into an electrical signal so as to generate an optical carrier, and a switching unit 2 including m aligned blocks each having n aligned thin film transistors respectively corresponding to the photoelectric converters of each corresponding block of the photoelectric conversion unit 1 and serving to sequentially output optical carriers from the photoelectric conversion unit 1. The contact image sensor further comprises m gate lines 3 respectively connected in common to gate electrodes of all thin film transistors of the same numbered blocks of the switching unit 2 and adapted to apply gate drive signals to the thin film transistors, n data lines 4 respectively connected in common to drain electrodes of the same numbered thin film transistors of the blocks of the switching unit 2 and adapted to transmit optical carriers outputted from the thin film transistors, a bias line 5 connected in common to all photoelectric converters of the photoelectric conversion unit 1 and adapted to apply a bias signal for a photoelectric conversion to the photoelectric converters, m gate line pads $G_1$ to $G_m$ respectively connected to the same numbered gate lines 3, n data line pads $D_1$ to $D_n$ respectively connected to the same numbered data lines 4, and a bias line pad C connected to the bias line 5.

Operation of the conventional type contact image sensor will be described.

Each of photoelectric converters of the photoelectric conversion unit 1 converts an optical signal into an electrical signal having a current intensity determined by the intensity of the optical signal, thereby generating an optical carrier.

As a bias signal of $-5$ V is applied to all the photoelectric converters via the bias line 5 and drive signals for thin film transistors are sequentially applied to the blocks of the switching unit 2 via the gate lines 3, all the thin film transistors of each block of the switching unit 2 receiving each corresponding drive signal are simultaneously turned on. As a result, the optical carriers generated from the photoelectric converters of each block are separately outputted via n data lines 4, respectively.

For example, when a high level signal is applied in common to the thin film transistors of the first block $B_1$ of the switching unit 2, the thin film transistors of the same block are simultaneously turned on, thereby causing the optical carriers from the corresponding photoelectric converters to be separately outputted via n data lines 4, respectively.

The above procedure is sequentially repeated until the last block of the switching unit 2 is driven. Thereafter, 0 V is applied to the bias line 5 so that the photoelectric conversion unit 1 can receive optical signals again to generate optical carriers.

However, this conventional type contact image sensor has problems of an undesirably narrow space and a severe overlap between neighboring data lines in a case of $n > m$, because at least n data lines are provided in a given region. Furthermore, a large overlap occurs between data and gate lines. Due to such problems, a parasitic capacitance is generated between the data lines or between the data and gate lines, thereby resulting in a crosstalk phenomenon causing a signal delay. As a result, scanning and processing rates of data communication terminal equipments are adversely affected. Moreover, a deterioration in resolution occurs.

Figure 2:
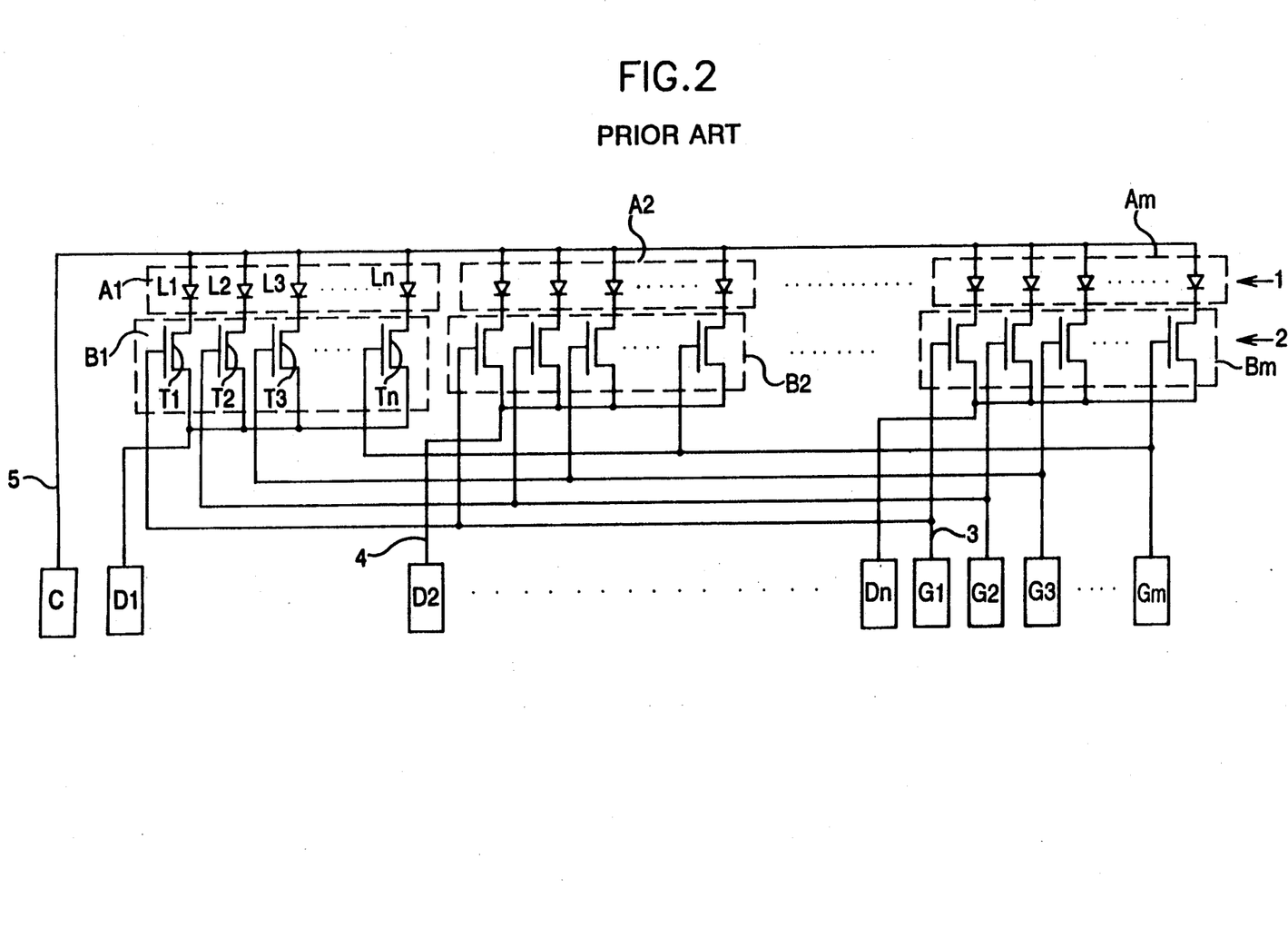
FIG. 2 is a circuit diagram of an alternative type contact image sensor in accordance with the prior art.

For solving the above-mentioned problems, there has been proposed an alternative type contact image sensor developed by Simens Company, Germany. Referring to FIG. 2, there is illustrated an example of such an alternative type contact image sensor. In FIG. 2, elements corresponding to those in FIG. 1 are denoted by the same reference numerals.

The contact image sensor of FIG. 2 has the same arrangement as that of FIG. 1, except for gate lines and data lines. In other words, the alternative type contact image sensor comprises a photoelectric conversion unit 1 including m aligned blocks each having n aligned photoelectric converters, a switching unit 2 including m aligned blocks each having n aligned thin film transistors respectively corresponding to the photoelectric converters of each corresponding block of the photoelectric conversion unit 1, n gate lines 3 respectively connected in common to gate electrodes of the same numbered thin film transistors of the blocks of the switching unit 2, and m data lines 4 respectively connected in common to drain electrodes of all thin film transistors of the same numbered blocks of the switching unit 2, as shown in FIG. 2.

Operation of the alternative type contact image sensor will be described.

Each of photoelectric converters of the photoelectric conversion unit 1 converts an optical signal into an electrical signal having a current intensity determined by the intensity of the optical signal, thereby generating an optical carrier.

As a bias signal of $-5$ V is applied to all the photoelectric converters via the bias line 5 and drive signals for thin film transistors are sequentially applied to the blocks of the switching unit 2 via the gate lines 3, the same numbered thin film transistors of all blocks of the switching unit 2 receiving corresponding drive signals are simultaneously turned on. As a result, the optical carriers generated from the photoelectric converters of the blocks are separately outputted via m data lines 4, respectively.

For example, when a high level signal is applied in common to the first thin film transistors of the blocks of the switching unit 2, the first thin film transistors are simultaneously turned on, thereby causing the optical carriers from the corresponding photoelectric converters to be separately outputted via m data lines 4, respectively.

The above procedure is sequentially repeated until the last thin film transistor of each block of the switching unit is driven. Outputting of optical carriers through each data line 4 is sequentially carried out in the order from the first photoelectric converter of each corresponding block to the last photoelectric converter.

Although this alternative type contact image sensor solves the problem of the overlap between neighboring data lines encountered in the afore-mentioned conventional type contact image sensor, it has a problem of a severe overlap between neighboring gate lines in a case of $n > m$. Furthermore, the data lines may have different lengths due to different positions of thin film transistors of the switching unit 2. Consequently, this alternative type contact image sensor solves insufficiently the problems encountered in the conventional type contact image sensor.

Figure 3:
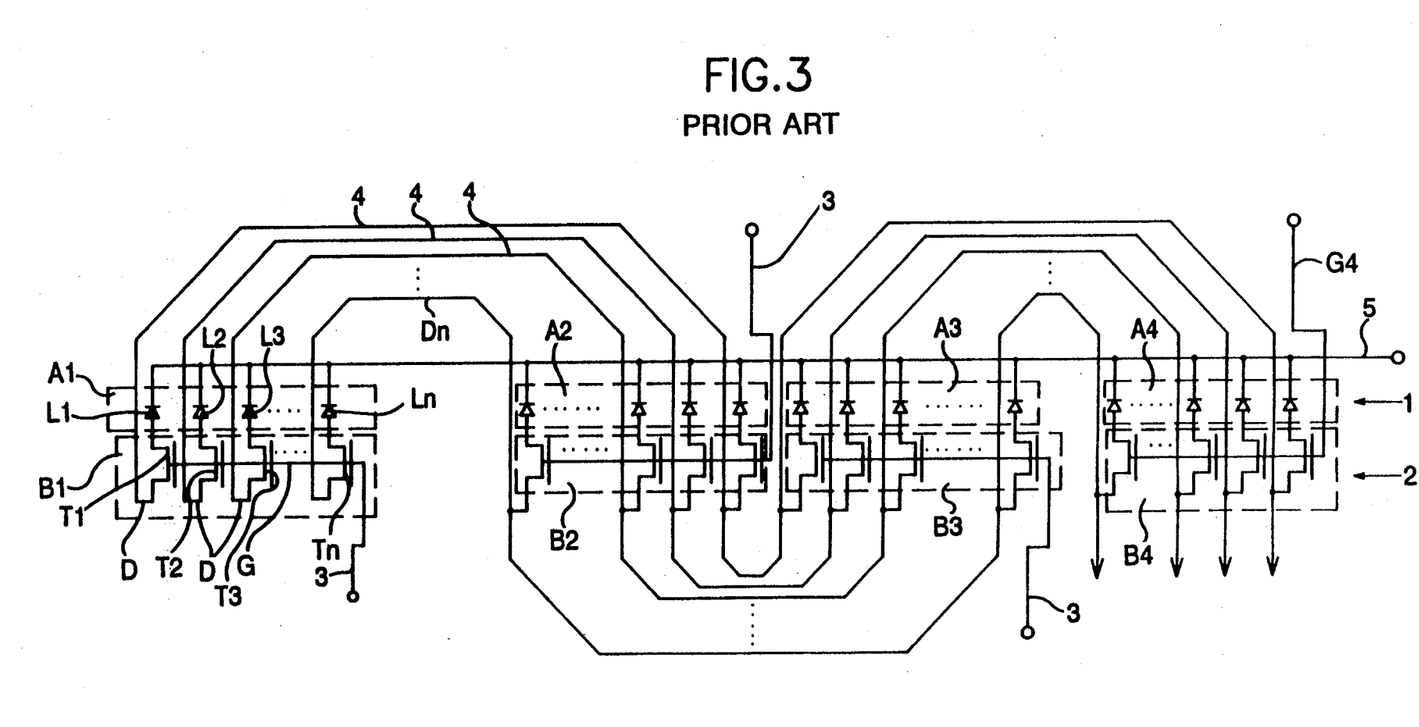
FIG. 3 is a circuit diagram of a meandering type contact image sensor in accordance with the prior art.

For solving the above-mentioned problems, there has been also proposed a contact image sensor having a meadering type data line arrangement developed by Fuji Xerox Company, Japan. Referring to FIG. 3, there is illustrated an example of such a meadering type contact image sensor. In FIG. 3, elements corresponding to those in FIG. 1 are denoted by the same reference numerals.

The contact image sensor of FIG. 3 has the same arrangement as those of FIG. 1, except for data lines. In other words, the meandering type contact image sensor comprises a photoelectric conversion unit 1 including m aligned blocks each having n aligned photoelectric converters, a switching unit 2 including m aligned blocks each having n aligned thin film transistors respectively corresponding to the photoelectric converters of each corresponding block of photoelectric conversion unit 1, m gate lines 3 respectively connected in common to gate electrodes of all thin film transistors of the same numbered blocks of the switching unit 2, and n data lines 4 respectively connected in common to drain electrodes of the same numbered thin film transistors of the odd-numbered blocks of the switching unit 2 and drain electrodes of the reversely-same numbered thin film transistors of the even-numbered blocks of the switching unit 2 in a manner that drain electrodes of the first thin film transistors of the odd-numbered blocks are connected with drain electrodes of the last thin film transistors of the even-numbered blocks while drain electrodes of the last thin film transistors of the odd-numbered blocks are connected with drain electrodes of the first thin film transistors of the even-numbered blocks, as shown in FIG. 3.

Drive signals for thin film transistors are sequentially applied to the blocks of the switching unit 2 via the gate lines 3, the optical carriers generated from the photoelectric converters of each block are separately outputted via n data lines 4 in a sequential manner, respectively.

Although this meandering type contact image sensor solves the problem of the overlap between neighboring data lines encountered in the afore-mentioned conventional type contact image sensor, it encounters design and manufacture difficulties because each data line must be designed to pass between adjacent picture elements. As a result, it is difficult to obtain a high resolution in the meandering type contact image sensor. Furthermore, since the length of each data line is extremely long, the data line resistance is increased, thereby resulting in a decrease in transmission efficiency.

SUMMARY OF THE INVENTION

Therefore, an object of the invention is to solve the above-mentioned problems encountered in the prior arts and to provide a contact image sensor capable of achieving a high resolution by using a combination of the alternative type and meandering type data line arrangements to avoid any data line overlap and reduce the number of data lines passing between adjacent picture elements.

In accordance with the present invention, this object can be accomplished by providing a contact image sensor comprising: a photoelectric conversion unit including m aligned blocks each having n aligned photoelectric conversion elements and serving to generate an optical carrier corresponding to an input optical signal; a switching unit including m aligned blocks each having n aligned switching elements classified into groups each having a predetermined number of switching elements and connected to respective photoelectric conversion elements of each corresponding block of said photoelectric conversion unit, said switching unit being adapted to switch outputting of said optical carrier from the photoelectric conversion unit; a plurality of data lines adapted to transmit optical carriers, said data lines being respectively connected in common to drain electrodes of the same numbered switching element groups of the odd-numbered blocks of the switching unit and drain electrodes of the reversely-same numbered switching element groups of the even-numbered blocks of the switching unit in a manner that drain electrodes of the first switching element groups of the odd-numbered blocks are connected with drain electrodes of the last switching element groups of the even-numbered blocks while drain electrodes of the last switching element groups of the odd-numbered blocks are connected with drain electrodes of the first switching element groups of the even-numbered blocks; a plurality of gate lines adapted to apply switching element drive signals to the switching unit, said gate lines being classified into groups each having a predetermined number of gate lines corresponding to said predetermined number of thin film transistors of each switching element group of the switching unit, said gate lines of each gate line group being respectively connected in common to gate electrodes of the same numbered switching elements of the switching element groups of each corresponding block of the switching unit; and a bias line connected in common to all photoelectric conversion elements of the photoelectric conversion unit and adapted to apply a bias signal to the photoelectric conversion elements.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Referring to FIGS. 4 to 7, there are illustrated contact image sensors in accordance with various embodiments of the present invention, respectively. In FIGS. 4 to 7, elements corresponding to those in FIG. 1 are denoted by the same reference numerals.

In each case, the contact image sensor of the present invention comprises a photoelectric conversion unit 1 including m aligned blocks each having n aligned photoelectric converters (photodiodes) $L_1$ to $L_n$, and a switching unit 2 including m aligned blocks each having n aligned thin film transistors $T_1$ to $T_n$ classified into $n/2^k$ ($k=1, 2, \ldots$) groups each having $2^k$ thin film transistors and connected to respective photoelectric converters $L_1$ to $L_n$ of each corresponding block of photoelectric conversion unit 1. The contact image sensor further comprises $2^k$ m gate lines 3 classified into groups each having $2^k$ gate lines respectively connected in common to gate electrodes of the same numbered thin film transistors of the thin film transistor groups of each corresponding block of the switching unit 2, $n/2^k$ data lines 4 respectively connected in common to drain electrodes of the thin film transistors of predetermined groups of the blocks of the switching unit 2 to construct an alternative type arrangement, and a bias line 5 connected in common to all photoelectric converters of the photoelectric conversion unit 1 and adapted to apply a bias signal for a photoelectric conversion to the photoelectric converters.

This construction will now be described in detail, in conjunction with the embodiments of the present invention respectively illustrated in FIGS. 4 to 7.

Figure 4:
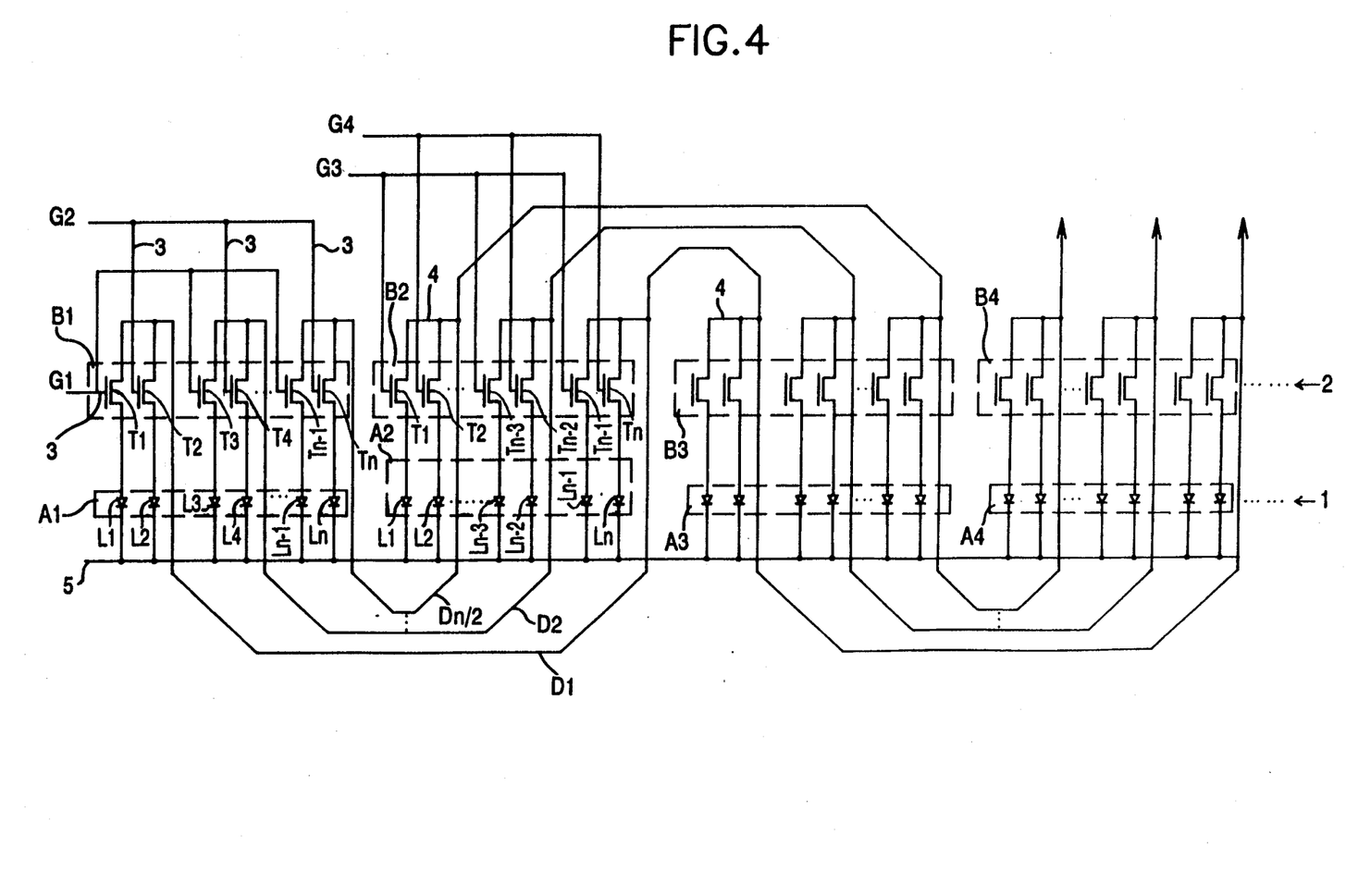
FIG. 4 is a circuit diagram of a contact image sensor in accordance with a first embodiment of the present invention.

FIG. 4 is a circuit diagram of a contact image sensor in accordance with a first embodiment of the present invention. This embodiment corresponds the case of $k=1$ when the thin film transistors of the switching unit 2 are classified into groups including $2^k$ thin film transistors. In accordance with this embodiment, the contact image sensor comprises a photoelectric conversion unit 1 including m aligned blocks $A_1$ to $A_m$ each having n aligned photoelectric converters (photodiodes) $L_1$ to $L_n$ and serving to convert an optical signal into an electrical signal, a switching unit 2 including m aligned blocks each having n aligned thin film transistors $T_1$ to $T_n$ classified into n/2 groups each having two adjacent thin film transistors and connected to respective photoelectric converters $L_1$ to $l_n$ of each corresponding block of the photoelectric conversion unit 1. The switching unit 2 serves to sequentially output optical carriers from the photoelectric conversion unit 1. The contact image sensor further comprises 2 m gate lines 3 adapted to apply thin film transistor drive signals to the switching unit 2 and classified into groups each having 2 gate lines respectively connected in common to gate electrodes of the odd-numbered thin film transistors of each corresponding block of the switching unit 2 and to gate electrodes of the even-numbered thin film transistors of each corresponding block of the switching unit 2. The contact image sensor further comprises n/2 data lines 4 adapted to transmit optical carriers. The n/2 data lines 4 are respectively connected in common to drain electrodes of the same numbered thin film transistor groups of the odd-numbered blocks of the switching unit 2 and drain electrodes of the reversely-same numbered thin film transistor groups of the even-numbered blocks of the switching unit 2 in a manner that drain electrodes of the first thin film transistor groups of the odd-numbered blocks are connected with drain electrodes of the last thin film transistor groups of the even-numbered blocks while drain electrodes of the last thin film transistor groups of the odd-numbered blocks are connected with drain electrodes of the first thin film transistor groups of the even-numbered blocks. A bias line 5 is connected in common to all photoelectric converters of the photoelectric conversion unit 1 and adapted to apply a bias signal for a photoelectric conversion to the photoelectric converters.

Operation of the contact image sensor having the above-mentioned arrangement in accordance with the first embodiment of the present invention will now be described.

Each of photoelectric converters of the photoelectric conversion unit 1 converts an optical signal into an electrical signal having a current intensity determined by the intensity of the optical signal, thereby generating an optical carrier.

As the thin film transistor of the switching unit 2 are turned on under a condition that a bias signal of $-5$ V is applied to all the photoelectric converters via the bias line 5, the optical carriers generated from the photoelectric converters are outputted via data lines 4, respectively.

In other words, a high signal is sequentially applied to 2 m gate lines 3. As a result, the odd-numbered thin film transistors of each block of the switching unit 2 are simultaneously turned on, thereby outputting optical carriers from the odd-numbered photoelectric converters. Then, the even-numbered thin film transistors of each block of the switching unit 2 are simultaneously turned on, thereby outputting optical carriers from the even-numbered photoelectric converters. These procedures are repeated from the first block of the switching unit 2 to the last block.

As mentioned above, since k is 1 in the first embodiment of the present invention, the number of gate lines 3 and the number of data lines 4 are 2 m and n/2, respectively.

Figure 5:
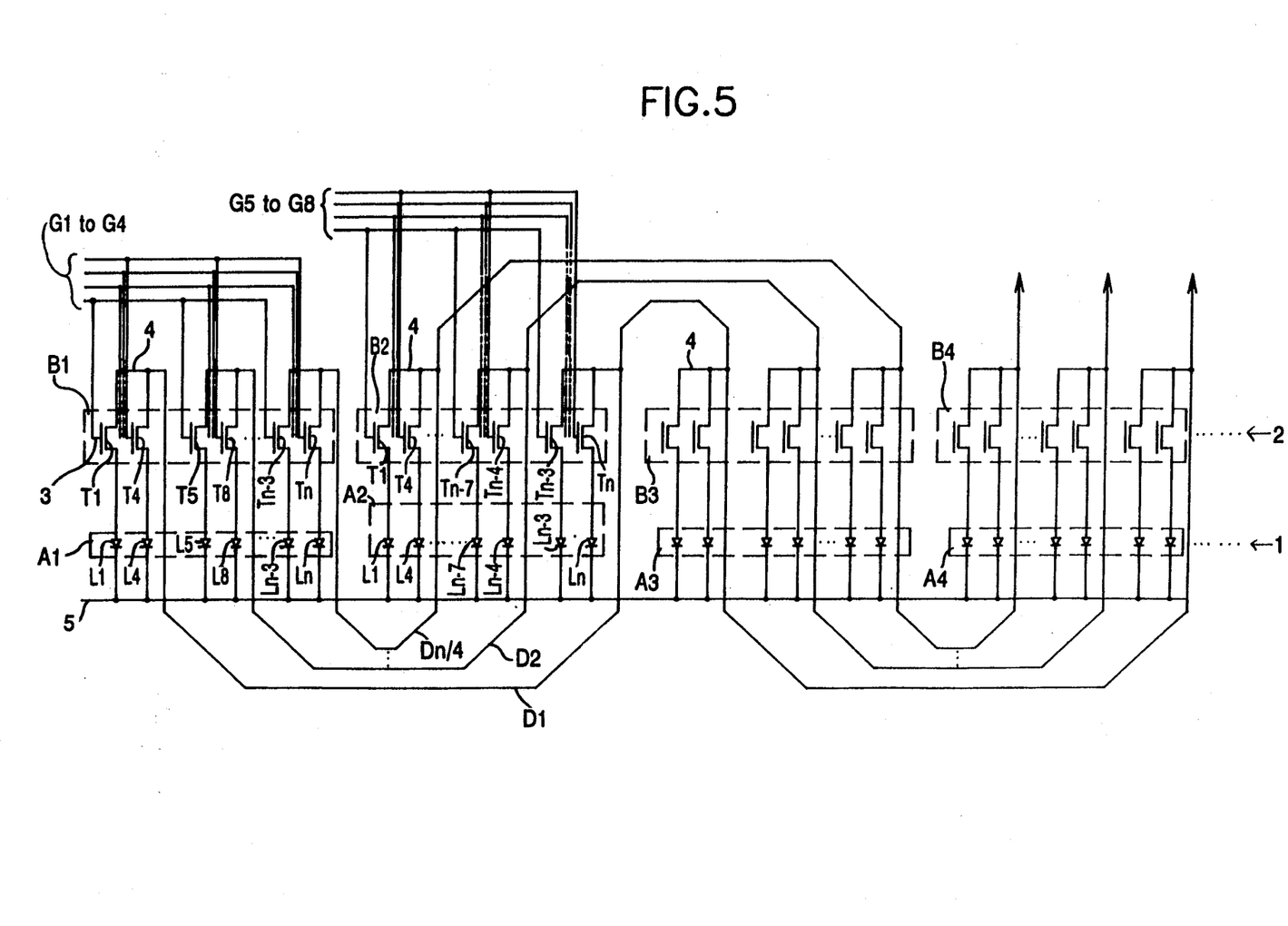
FIG. 5 is a circuit diagram of a contact image sensor in accordance with a second embodiment of the present invention.

FIG. 5 is a circuit diagram of a contact image sensor in accordance with a second embodiment of the present invention. This embodiment corresponds the case of $k=2$ when the thin film transistors of the switching unit 2 are classified into groups including $2^k$ thin film transistors. In accordance with this embodiment, the contact image sensor comprises a photoelectric conversion unit.

1 including m aligned blocks $A_1$ to $A_m$ each having n aligned photoelectric converters (photodiodes) $L_1$ to $L_n$, a switching unit 2 including m aligned blocks each having n aligned thin film transistors $T_1$ to $T_n$ classified into n/4 groups each having four adjacent thin film transistors and connected to respective photoelectric converters $L_1$ to $L_n$ of each corresponding block of the photoelectric conversion unit 1. The contact image sensor further comprises 4 m gate lines 3 classified into groups each having 4 gate lines respectively connected in common to gate electrodes of the correspondingly numbered thin film transistors of the thin film transistor groups of each corresponding block of the switching unit 2, and n/4 data lines 4 respectively connected in common to drain electrodes of the same numbered thin film transistor groups of the odd-numbered blocks of the switching unit 2 and drain electrodes of the reversely-same numbered thin film transistor groups of the even-numbered blocks of the switching unit 2 in a manner that drain electrodes of the first thin film transistor groups of the odd-numbered blocks are connected with drain electrodes of the last thin film transistor groups of the even-numbered blocks while drain electrodes of the last thin film transistor groups of the odd-numbered blocks are connected with drain electrodes of the first thin film transistor groups of the even-numbered blocks.

Figure 6:
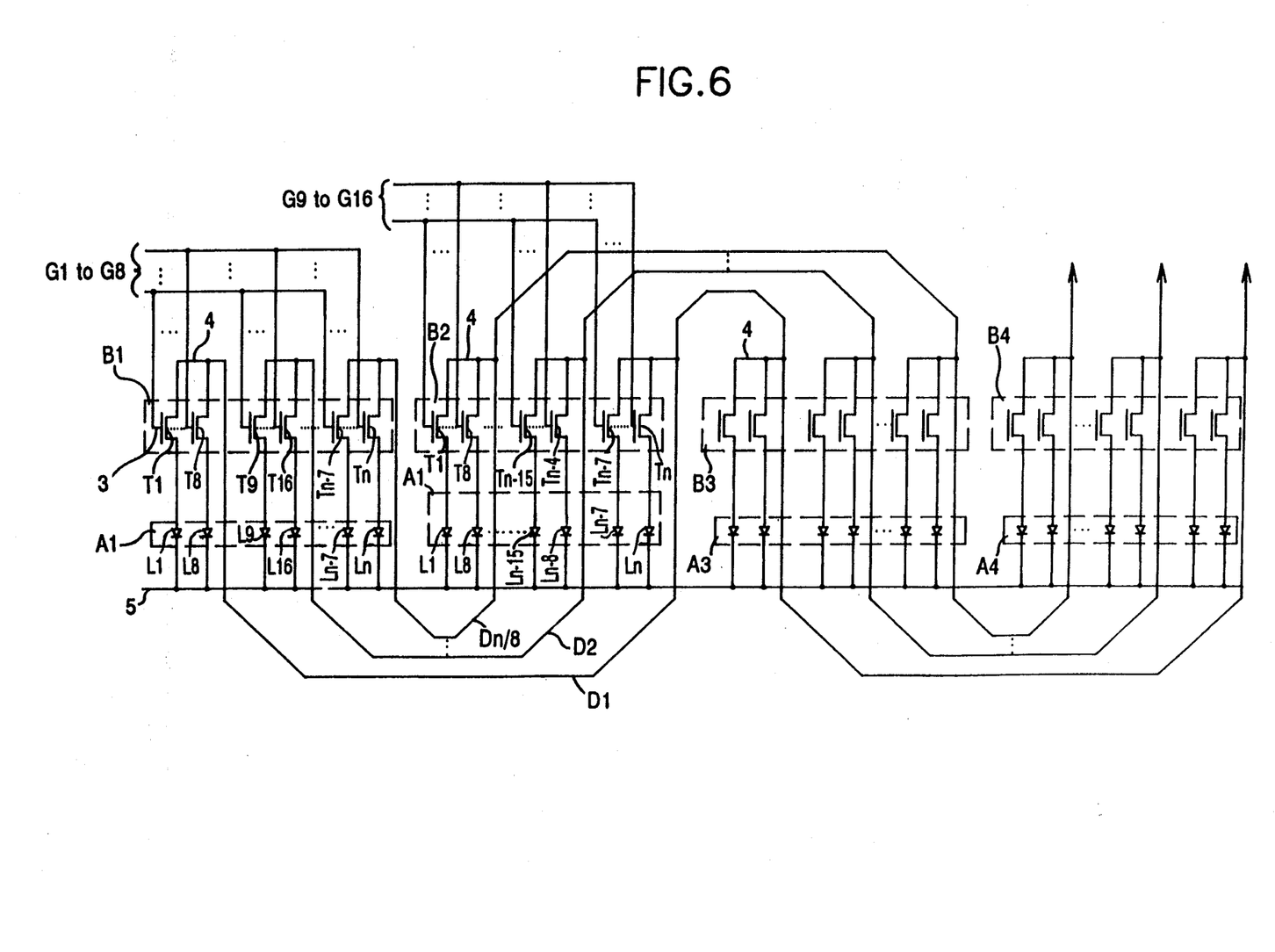
FIG. 6 is a circuit diagram of a contact image sensor in accordance with a third embodiment of the present invention.
Figure 7:
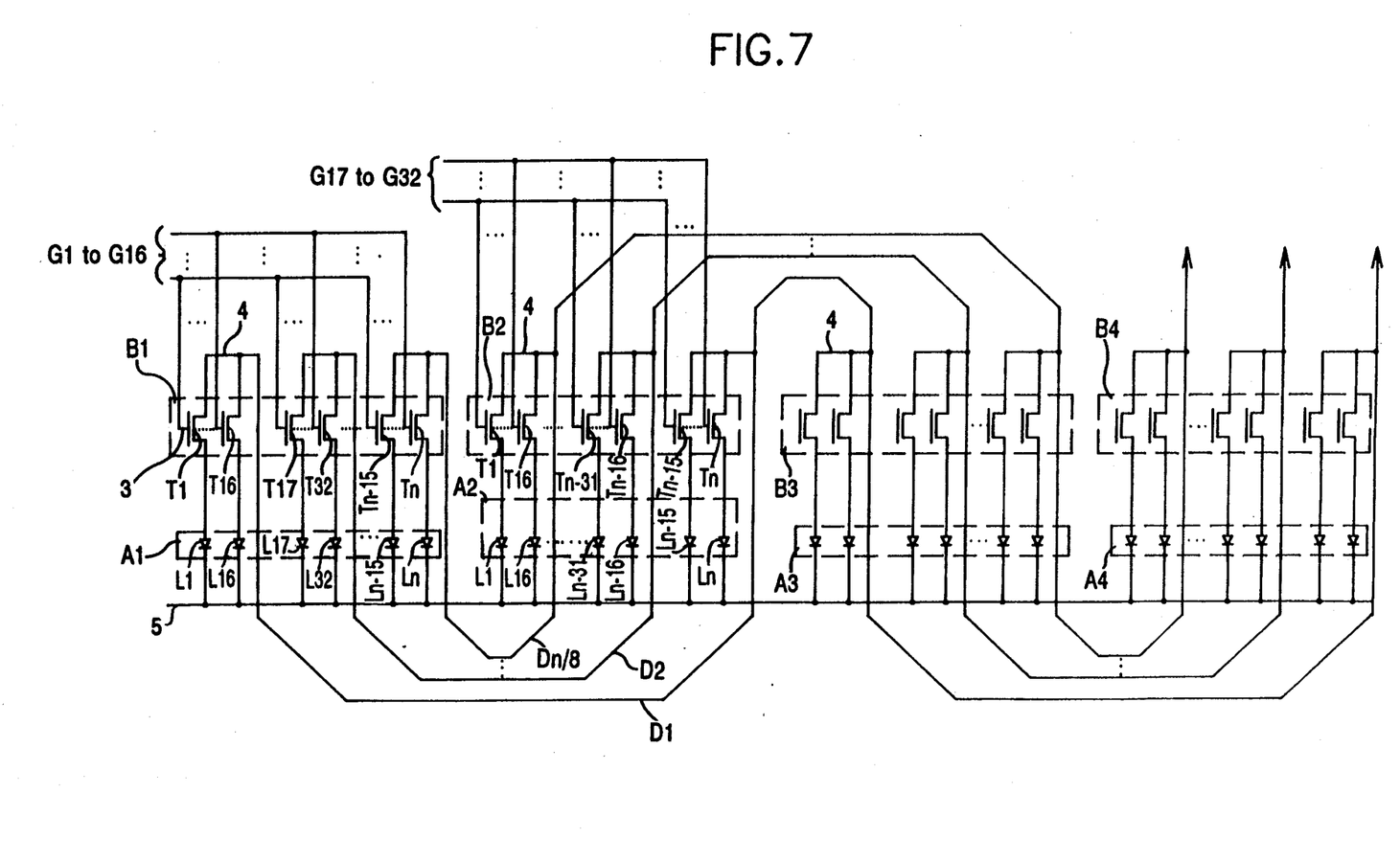
FIG. 7 is a circuit diagram of a contact image sensor in accordance with a fourth embodiment of the present invention.

FIG. 6 is a circuit diagrams of a contact image sensor in accordance with a third embodiment of the present invention. This embodiment corresponds the case of k=3 when the thin film transistors of the switching unit 2 are classified into groups including $2^k$ thin film transistors. FIG. 7 is a circuit diagrams of a contact image sensor in accordance with a fourth embodiment of the present invention. This embodiment corresponds the case of k=4.

In accordance with these embodiments, the switching unit 2 including m aligned blocks each having n aligned thin film transistors $T_1$ to $T_n$ are classified into n/8 groups each having 8 ($2^3$) adjacent thin film transistors (FIG. 6) or n/16 groups each having 16 ($2^4$) adjacent thin film transistors (FIG. 7). In these cases, gate lines 3 are arranged such that they are classified into groups each having gate lines respectively corresponding to the thin film transistors of each thin film transistor group of each corresponding block of the switching unit 2. Data lines 4 are arranged such that they are respectively connected in common to drain electrodes of the same numbered thin film transistor groups of the odd-numbered blocks of the switching unit 2 and drain electrodes of the reversely-same numbered thin film transistor groups of the even-numbered blocks of the switching unit 2 in a manner that drain electrodes of the first thin film transistor groups of the odd-numbered blocks are connected with drain electrodes of the last thin film transistor groups of the even-numbered blocks while drain electrodes of the last thin film transistor groups of the odd-numbered blocks are connected with drain electrodes of the first thin film transistor groups of the even-numbered blocks.

Where the number of thin film transistors of each group is $2^3$, as shown in FIG. 6, the number of data lines 4 is n/8 (n/$2^3$) and the number of gate lines 3 is 8 m ($2^3$ m). Where the number of thin film transistors of each group is $2^4$, as shown in FIG. 7, the number of data lines 4 is n/16 (n/$2^4$) and the number of gate lines 3 is 16 m ($2^4$ m).

Operations of the contact image sensor in accordance with the embodiment shown each of FIGS. 6 and 7 are identical to those of FIGS. 4 and 5. Only the difference of the embodiments shown in FIGS. 6 and 7 from the embodiments shown in FIGS. 4 and 5 is that the number of thin film transistors simultaneously turned on by one drive pulse signal is reduced.

As apparent from the above description, the present invention provides a contact image sensor having an arrangement capable of reducing the number of data lines passing adjacent photoelectric converters, thereby achieving a high resonance and an easy design.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A contact image sensor comprising:

a photoelectric conversion unit including m aligned blocks each having n aligned photoelectric conversion elements and serving to generate an optical carrier corresponding to an input optical signal;

a switching unit including m aligned blocks each having n aligned switching elements classified into groups each having a predetermined number of switching elements and connected to respective photoelectric conversion elements of each corresponding block of said photoelectric conversion unit, said switching unit being adapted to switch outputting of said optical carrier from the photoelectric conversion unit;

a plurality of data lines adapted to transmit optical carriers, said data lines being respectively connected in common to drain electrodes of the same numbered switching element groups of the odd-numbered blocks of the switching unit and drain electrodes of the reversely-same numbered switching element groups of the even-numbered blocks of the switching unit in a manner that drain electrodes of the first switching element groups of the odd-numbered blocks are connected with drain electrodes of the last switching element groups of the even-numbered blocks while drain electrodes of the last switching element groups of the odd-numbered blocks are connected with drain electrodes of the first switching element groups of the even-numbered blocks;

a plurality of gate lines adapted to apply switching element drive signals to the switching unit, said gate lines being classified into groups each having a predetermined number of gate lines corresponding to said predetermined number of thin film transistors of each switching element group of the switching unit, said gate lines of each gate line group being respectively connected in common to gate electrodes of the same numbered switching elements of the switching element groups of each corresponding block of the switching unit; and a bias line connected in common to all photoelectric conversion elements of the photoelectric conversion unit and adapted to apply a bias signal to the photoelectric conversion elements.

2. A contact image sensor in accordance with claim 1, wherein each of said switching element groups of the switching unit has $2^k$ switching elements so that the number of said data lines is n/$2^k$ while the number of said gate lines is $2^k$m.

3. A contact image sensor in accordance with claim 2, wherein said value k is a positive integer.

4. A contact image sensor in accordance with claim 1, wherein each of said photoelectric conversion elements is a photodiode.

5. A contact image sensor in accordance with claim 1, wherein each of said switching elements is a thin film transistor.

* * * * *